United States Patent
Wu et al.

(10) Patent No.: US 11,139,537 B2
(45) Date of Patent: Oct. 5, 2021

(54) BATTERY MODULE

(71) Applicant: Contemporary Amperex Technology Co., Limited, Ningde (CN)

(72) Inventors: Anwei Wu, Ningde (CN); Dong Li, Ningde (CN); Xing Wang, Ningde (CN); Huihui Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 44 days.

(21) Appl. No.: 16/669,323

(22) Filed: Oct. 30, 2019

(65) Prior Publication Data
US 2020/0212403 A1 Jul. 2, 2020

(30) Foreign Application Priority Data

Dec. 26, 2018 (CN) .......................... 201822197254.3

(51) Int. Cl.
*H01M 50/502* (2021.01)
*H01M 50/20* (2021.01)
(Continued)

(52) U.S. Cl.
CPC ......... *H01M 50/502* (2021.01); *H01M 50/20* (2021.01); *H01M 50/503* (2021.01); *H01M 50/552* (2021.01)

(58) Field of Classification Search
CPC ....... H01M 50/50–533; H01M 50/503; H01M 50/507; H01M 50/514; H01M 50/528;
(Continued)

(56) References Cited

U.S. PATENT DOCUMENTS

2009/0208836 A1   8/2009  Fuhr et al.
2010/0105239 A1*  4/2010  Li .................. H01M 50/502
                                            439/366
(Continued)

FOREIGN PATENT DOCUMENTS

EP        2500964 A2    9/2012
JP     2015-015082 A    1/2015
(Continued)

OTHER PUBLICATIONS

Machine translation of JP6153789 originally published to Hitachi Automotive Systems Ltd. on Jun. 9, 2017. (Year: 2017).*
(Continued)

*Primary Examiner* — Milton I Cano
*Assistant Examiner* — Andrew J Miller
(74) *Attorney, Agent, or Firm* — Blue Filament Law PLLC (57) ABSTRACT

The present disclosure provides a battery module. The battery module includes a plurality of secondary batteries stacked along a thickness direction, a top of each secondary battery being provided with an electrode terminal; and a connecting component provided at the top of the secondary battery, the connecting component being connected to at least two electrode terminals for electrically connecting at least two secondary batteries. The connecting component includes a first fixed connecting piece and a second fixed connecting piece, and along an extending direction of the connecting component, the first fixed connecting piece matches and is engaged with the second fixed connecting piece. The present disclosure solves the problem of the unreliable connection between the connecting component and the electrode terminal.

5 Claims, 6 Drawing Sheets

(51) Int. Cl.
H01M 50/503 (2021.01)
H01M 50/552 (2021.01)

(58) Field of Classification Search
CPC .. H01M 50/543; H01M 50/552; H01M 50/54; H01M 2/206; H01M 2/22; H01M 2/202; H01M 2/266; H01M 2/307; H01M 2/20; H01M 2/26; H01M 2/30; H01M 2/305; H01M 2/204; H01M 2/1016; Y02E 60/10
See application file for complete search history.

(56) References Cited

U.S. PATENT DOCUMENTS

| | | | | |
|---|---|---|---|---|
| 2011/0104556 A1* | 5/2011 | Kim | ................... | H01M 50/502 429/160 |
| 2011/0159353 A1* | 6/2011 | Byun | .................. | H01M 50/528 429/160 |
| 2012/0121966 A1* | 5/2012 | Kim | ................... | H01M 50/543 429/158 |
| 2015/0180008 A1* | 6/2015 | Lee | ..................... | H01M 50/502 429/121 |
| 2016/0329542 A1* | 11/2016 | Tyler | ................... | H01M 50/528 |
| 2017/0054126 A1* | 2/2017 | Kim | ................... | H01M 50/502 |

FOREIGN PATENT DOCUMENTS

| | | | | |
|---|---|---|---|---|
| JP | 6153789 B2 * | 6/2017 | ............. | Y02E 60/10 |
| WO | 2016178726 A1 | 11/2016 | | |
| WO | 2017209428 A1 | 12/2017 | | |

OTHER PUBLICATIONS

Communication issued in corresponding EP Patent Appln. No. 19206002, dated Apr. 30, 2020.

* cited by examiner

BATTERY MODULE

CROSS-REFERENCE TO RELATED APPLICATIONS

The present application claims priority to Chinese Patent Application No. 201822197254.3, filed on Dec. 26, 2018, the content of which is incorporated herein by reference in its entirety.

TECHNICAL FIELD

The present disclosure relates to the technical field of energy storage devices, and in particular, to a battery module.

BACKGROUND

In a battery module, a plurality of secondary batteries is required to be electrically connected to each other, so as to meet parameter requirements during use. During the manufacturing process of the secondary batteries, errors may occur, which can lead to nonuniform gaps between the connecting component and the electrode terminal. If a gap between the connecting component and the electrode terminal is too large, it is likely to result in an insufficient welding of the connecting component.

SUMMARY

The present disclosure provides a battery module, aiming to solve the problem of connection reliability between the connecting component and the electrode terminal of battery.

The present disclosure provides a battery module. The battery module includes a plurality of secondary batteries stacked along a thickness direction, a top of each of the plurality of secondary batteries being provided with an electrode terminal; and a connecting component provided at the top of the plurality of secondary batteries, the connecting component being connected to at least two electrode terminals for electrically connecting at least two secondary batteries of the plurality of secondary batteries. The connecting component includes a first fixed connecting piece and a second fixed connecting piece, and extends along a thickness direction of the connecting component, and the first fixed connecting piece matches and is engaged with the second fixed connecting piece.

In an embodiment, an edge of the first fixed connecting piece is provided with a recess, and an edge of the second fixed connecting piece is provided with a protrusion for matching the recess.

In an embodiment, the second fixed connecting piece includes a transitional connecting piece and a third fixed connecting piece, the protrusion is formed on the transitional connecting piece, and the transitional connecting piece connects the first fixed connecting piece with the third fixed connecting piece.

In an embodiment, the recess penetrates the first fixed connecting piece in a thickness direction of the first fixed connecting piece, and the protrusion has a same thickness as the second fixed connecting piece.

In an embodiment, the recess includes two inner side walls and a bottom wall connecting the two inner side walls; the protrusion includes two outer side walls and a top wall connecting the two outer side walls; and the inner side walls are in contact with and match the outer side walls.

In an embodiment, the inner side walls are engaged with the outer side walls through a tooth structure, and the tooth structure extends along the extending direction of connecting component.

In an embodiment, a distance between the two inner side walls gradually decreases in a direction facing away from the bottom wall, and a distance between the two outer side walls gradually decreases in a direction facing away from the top wall.

In an embodiment, the recess is a dovetail slot, and the protrusion is a dovetail block matching the dovetail slot.

In an embodiment, a gap is formed between the bottom wall and the top wall.

In an embodiment, the gap is located at a top of the electrode terminal, and does not exceed an edge of the electrode terminal.

The technical solutions of the present disclosure can bring the following beneficial effects.

The battery module provided by the present disclosure includes a plurality of secondary batteries, and the plurality of secondary batteries is connected in series and/or in parallel by connecting components. The connecting component includes a first fixed connecting piece and a second fixed connecting piece, and the first fixed connecting piece and the second fixed connecting piece are respectively connected to different electrode terminals. Through a split structure of the connecting component, a connecting surface between the first fixed connecting piece and the electrode terminal and a connecting surface between the second fixed connecting piece and the electrode terminal can located at planes of different heights to compensate an error of the batteries in a height direction, thereby ensuring a reliable connection between the connecting component and the electrode terminals. Along the extending direction of the connecting component, the first fixed connecting piece and the second fixed connecting piece match each other and are engaged, which increases the reliability of the connection between the first fixed connecting piece and the second fixed connecting piece. This can prevent the first fixed connecting piece from being detached from the second fixed connecting piece under an expansion force of the batteries, which would otherwise result in a failure of the connecting component.

It should be understood that the above general description and the following detailed description are merely illustrative, but are not intended to limit the present disclosure.

REFERENCE NUMBER 1 secondary battery;
10 electrode terminal;
2 connecting component;
2a first fixed connecting piece;
2b second fixed connecting piece;
2c transitional connecting piece;
2b third fixed connecting piece;
20 recess;
200 inner side wall;
202 bottom wall;
22 protrusion;
220 outer side wall;
222 top wall;
24 gap;
26 first edge;
28 second edge.

The accompanying drawings, which illustrate embodiment of the present disclosure, are incorporated in the description for explaining the principle of the present disclosure, and constitute a part of claims.

DESCRIPTION OF EMBODIMENTS

In order to more clearly describe the purpose, the technical solutions of the embodiments of the present disclosure, the present application will be described in detail below with reference to the accompanying drawings. It should be understood that, the described embodiments are merely intended to describe the present disclosure, but not intended to limit the present disclosure.

In the present disclosure, the terms "first" and "second" are used for the purpose of description only, and are not to be construed as indicating or implying relative importance. The term "plurality of" means two or more; the terms "connected", "fixed", and the like should be understood in broad scope, unless otherwise specified. For example, the term "connected" indicates a fixed connection, a detachable connection, a one-piece connection or an electrical connection; a direct connection, or an indirect connection through an intermediate element. Those skilled in the art are able to understand the specific meanings of the above terms in the present disclosure according to the actual situations.

It should be understood that terms indicating orientations or positions, such as "upper", "lower", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

As shown in FIG. 1 to FIG. 8, the embodiments of the present disclosure provide a battery module, which includes a plurality of secondary batteries 1 and connecting components 2. The plurality of secondary batteries 1 is sequentially arranged in a thickness direction, and a fixing means can be provided around and fix the plurality of secondary batteries 1. Each secondary battery 1 has an electrode terminal 10 provided on its top. Each connecting component 2 is disposed at the top of the secondary battery 1 and connected to at least two electrode terminals 10, so as to electrically connect at least two secondary batteries. Each connecting component 2 includes a first fixed connecting piece 2a and a second fixed connecting piece 2b. The first fixed connecting piece 2a and the second fixed connecting piece 2b are connected to two different electrode terminals 10, respectively. Through a split structure of the connecting component 2, a connecting surface between the first fixed connecting piece 2a and the electrode terminal 10 and a connecting surface between the second fixed connecting piece 2b and the electrode terminal 10 are located at planes of different heights to compensate an error of the batteries in a height direction, thereby ensuring a reliable connection between the connecting component 2 and the electrode terminals 10. Along an extending direction of the connecting component 2 (i.e., a direction perpendicular or nearly perpendicular to a thickness direction of the connecting component 2), the first fixed connecting piece 2a and the second fixed connecting piece 2b match each other and are engaged, which increases the reliability of the connection between the first fixed connecting piece 2a and the second fixed connecting piece 2b. This can prevent the first fixed connecting piece 2a from being detached from the second fixed connecting piece 2b under an expansion force of the batteries, which would otherwise result in a failure of the connecting component 2.

For example, one of the first fixed connecting piece 2a and the second fixed connecting piece 2b can be provided with an engaged hole, and the other one can be provided with an engaged block matching the engaged hole. The engaged hole has a certain depth along the thickness direction of the connecting component 2, and the engaged block has a certain thickness along the thickness direction of the connecting component 2. Along the thickness direction of the connecting component 2, the first fixed connecting piece 2a and the second fixed connecting piece 2b can be assembled through a guiding effect of the engagement between the engaged block and engaged hole, and the error of batteries in the height direction is compensated. Along the extending direction of the connecting component 2, the first fixed connecting piece 2a and the second fixed connecting piece 2b cannot be detached from each other through the matching engagement between the engaged hole and the engaged block, thereby ensuring the reliability of the connecting component 2.

Figure 3:
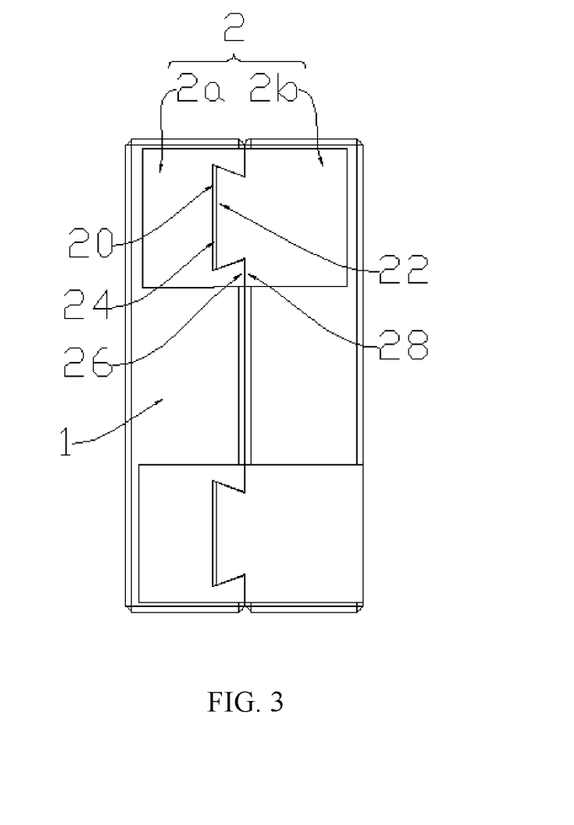
FIG. 3 is another structural schematic diagram of a battery module provided in an embodiment of the present disclosure.

For example, as shown in FIG. 3, the first fixed connecting piece 2a has a first edge 26, i.e., an edge of the first fixed connecting piece 2a facing towards the second fixed connecting piece 2b, and the first edge 26 is provided with a recess 20. The second fixed connecting piece 2b has a second edge 28, i.e., an edge of the second fixed connecting piece 2b facing towards the first fixed connecting piece 2a, and the second edge 28 is provided with a protrusion 22 for engaging with the recess 20. The recess 20 and the protrusion 22 can be engaged by matching each other, which is simple in structure and easy to be processed. It can be understood that the edge of the first fixed connecting piece 2a can be provided with the recess 20 spacing apart from the protrusion 22, and accordingly, the edge of the second fixed connecting piece 2b can be provided with the protrusion 22 spacing apart from the recess 20.

The recess 20 has a certain depth along a thickness direction of the first fixed connecting piece 2a, and in the thickness direction of the first fixed connecting piece 2a, at least one side of the recess 20 is open, such that the first fixed connecting piece 2a and the second fixed connecting piece 2b can be assembled and adjusted in the thickness direction of the connecting component 2. The protrusion 22 has a certain thickness along a thickness direction of the second fixed connecting piece 2b, and the thickness of the protrusion 22 is not greater than the thickness of the second fixed connecting piece 2b, in order to form a height adjustment space.

The recess 20 penetrates the first fixed connecting piece 2a in the thickness direction of the first fixed connecting piece 2a, and the protrusion 22 has the same thickness as the second fixed connecting piece 2b. In this way, the structure of the first fixed connecting piece 2a and the second fixed connecting piece 2b is simplified, and the thickness of the engagement portion of the first fixed piece 2a and the second fixed connecting piece 2b is maximized, thereby ensuring the connection strength therebetween and preventing a breakage of the engagement portion under the expansion force of the batteries.

Further, the recess 20 includes two inner side walls 200, and a bottom wall 202 connecting the two inner side walls 200. The bottom wall 202 is away from the first edge 26 and connected to the first edge 26 through the inner side walls 200. The protrusion 22 includes two outer side walls 220, and a top wall 222 connecting the two outer side walls 220. The top wall 222 is away from the second edge 28 and connected to the second edge 28 through the outer side walls 220. The inner side walls 200 contact and match the outer side walls 220, limiting and guiding the first fixed connecting piece 2a and the second fixed connecting piece 2b along the extending direction of the connecting component 2, so as to prevent the first fixed connecting piece 2a and the second fixed connecting piece 2b from relatively rotating during the assembly process.

Figure 4:
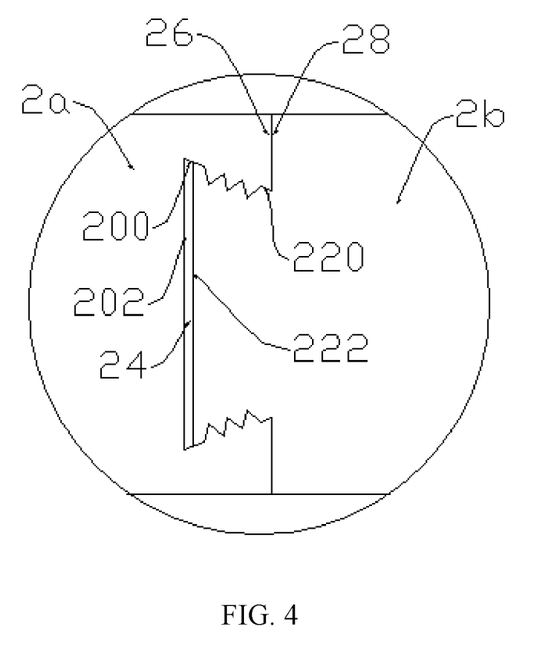
FIG. 4 is a partial structural schematic diagram of a connecting piece provided in an embodiment of the present disclosure.

Referring to FIG. 4, in one embodiment, the inner side walls 200 are engaged with the outer side walls 220 through a tooth structure, so as to achieve the engagement and matching of the first fixed connecting piece 2a and the second fixed connecting piece 2b, thereby leading to the reliable connection with low looseness. The tooth structure extends along the thickness direction of the connecting component 2, in such a manner that the first fixed connecting piece 2a and the second fixed connecting piece 2b can be assembled and adjusted along the thickness direction of the connecting component 2.

Figure 5:
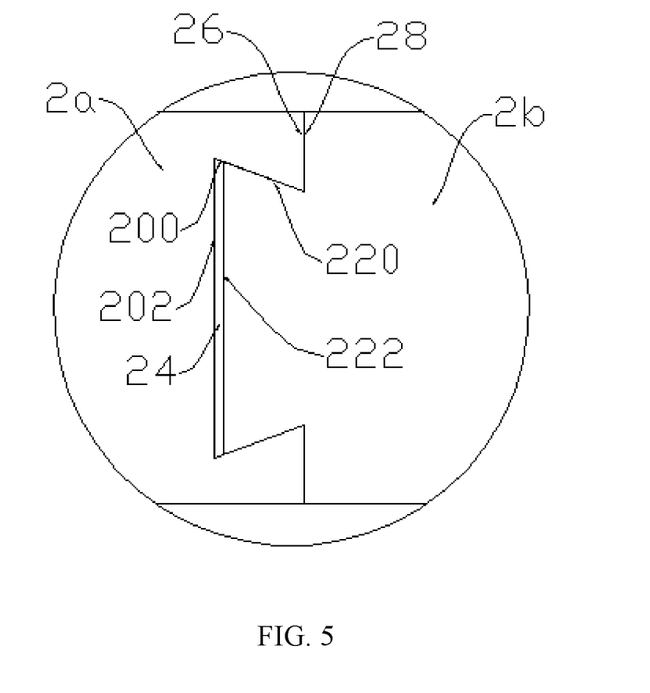
FIG. 5 is another partial structural schematic diagram of a connecting piece provided in an embodiment of the present disclosure.
Figure 6:
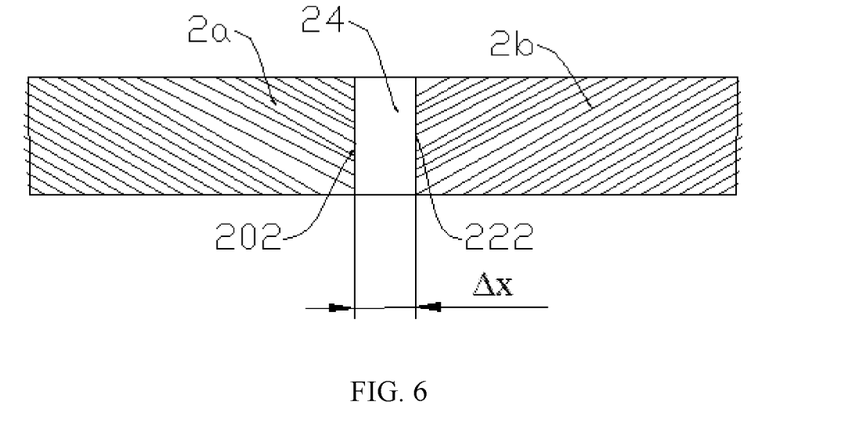
FIG. 6 is a cross-sectional view of a connecting piece provided in an embodiment of the present disclosure.
Figure 7:
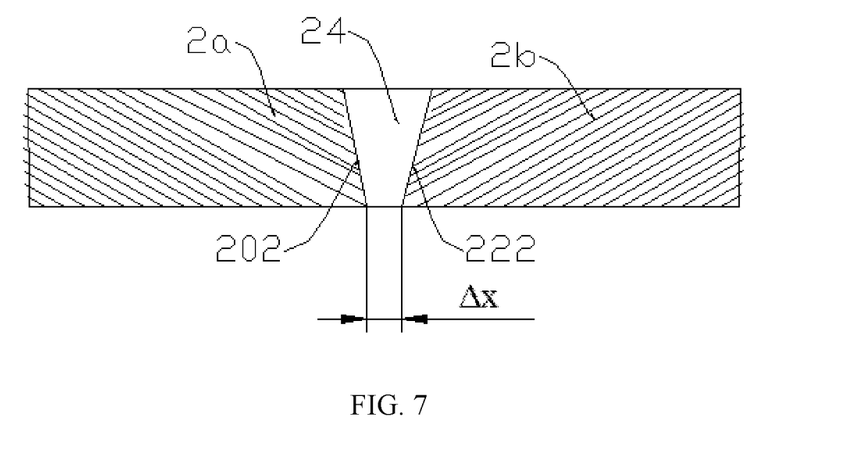
FIG. 7 is another cross-sectional view of a connecting piece provided in an embodiment of the present disclosure.
Figure 8:
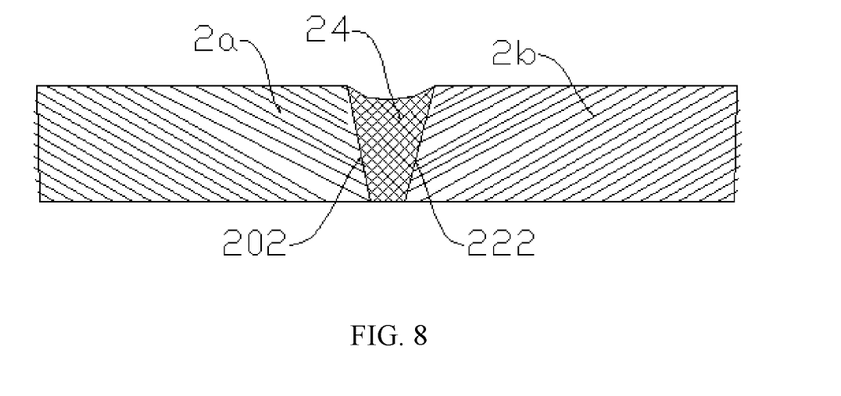
FIG. 8 is a structural schematic diagram of the connecting piece shown in FIG. 8, after finishing a welding.

Referring to FIG. 5, in another embodiment, the inner side walls 200 are engaged with the outer side walls 220 through a convergent mouth-like structure, so as to achieve the engagement and matching of the first fixed connecting piece 2a and the second fixed connecting piece 2b. In this way, the inner side walls 200 are engaged with the outer side walls 220 can keep flat or smooth to avoid stress concentration. For example, a distance between the two inner side walls 200 gradually decreases in a direction facing away from the bottom wall 200, and a distance between the two outer side walls 220 gradually decreases in a direction facing away from the top wall 222.

For example, when the inner side walls 200 and the outer side walls 220 match each other and are engaged through the convergent mouth-like structure, the recess 20 is a dovetail slot, and the protrusion 22 is a dovetail block, such that the first fixed connecting piece 2a and the second fixed connecting piece 2b have a simple and neat overall structure, which simplifies the processing and assembling operations. An angle included between the inner side wall 200 and the bottom wall 202 is a first angle, and an angle included between the outer side wall 220 and the top wall 222 is a second angle. In order to ensure the connection strength between the first fixed connecting piece 2a and the two fixed connecting pieces 2b, the second angle should be equal to the first angle, so that the inner side wall 200 and the outer side wall 220 can exactly match each other. For example, the first angle is in a range from 45° to 85°. When the first angle is smaller than 45°, it is likely to generate the stress concentration and further cause the breakage; and when the first angle is greater than 85°, it is likely to cause a failure of the engagement.

When the first fixed connecting piece 2a and the second fixed connecting piece 2b are assembled, i.e., respectively connected to different electrode terminals 10, the first fixed connecting piece 2a and the second fixed connecting piece 2b can be fixedly connected by welding, so as to prevent a relative movement or detachment of the first fixed connecting piece 2a and the second fixed connecting piece 2b in the thickness direction of the connecting component 2 during use.

For example, a gap 24 is formed between the bottom wall 202 and the top wall 222, and the laser welding is performed at the gap 24. The laser is repeatedly reflected in the gap 24, which increases a laser absorption rate of the connecting component 2, thereby reducing welding power and reducing a welding spatter. It has been verified by tests that the welding spatter can be reduced by more than 90%. During the welding, the metal on both sides of the gap 24 melts and fills the gap 24. After the welding is completed, a slight depression is formed at the gap 24 (see FIG. 8).

In an embodiment, the gap 24 has a structure that is wide at the top and narrow at the bottom (e.g., an inverted trapezoid, see FIG. 7), or a structure that has identical widths at the top and the bottom (e.g., a rectangle, see FIG. 6), in order to ensure that the laser can be reflected for multiple times within the gap 24, thereby increasing the laser absorption rate of the connecting component 2. The gap 24 has an upper bottom angle in a range from 45° to 90°. If the upper bottom angle is smaller than 45°, the number of reflections of the laser in the gap 24 is reduced, resulting in a decrease in the laser absorption rate of the connecting component. If the upper bottom angle is greater than 90°, the filling amount of the molten metal in the gap 24 is insufficient, and a depth of fusion is likely to be too excessive, which would cause a welding penetration. When the upper bottom angle is exactly 90°, the gap 24 is a rectangle 240.

Further, the gap 24 has the minimum width Δx of 0.3 mm to 1.5 mm, which is conducive to the welding operation of the first fixed connecting piece 2a and the second fixed connecting piece 2b and reduces the welding spatter. If the minimum width Δx of the gap 24 is smaller than 0.3 mm, a higher requirement is raised upon the laser spot and the welding precision, which increases the welding difficulty. If the minimum width Δx of the gap 24 is greater than 1.5 mm, the number of reflections of the laser in the gap 24 is reduced, and thus the laser absorption rate is reduced.

For example, the gap 24 is located at the top of the electrode terminal 10, and does not exceed an edge of the electrode terminal 10, so that a welding position is located at the top of the electrode terminal 10, thereby increasing the safety of welding, and preventing the welding spatter or welding penetration from directly occurring on a top cover of the battery.

Figure 1:
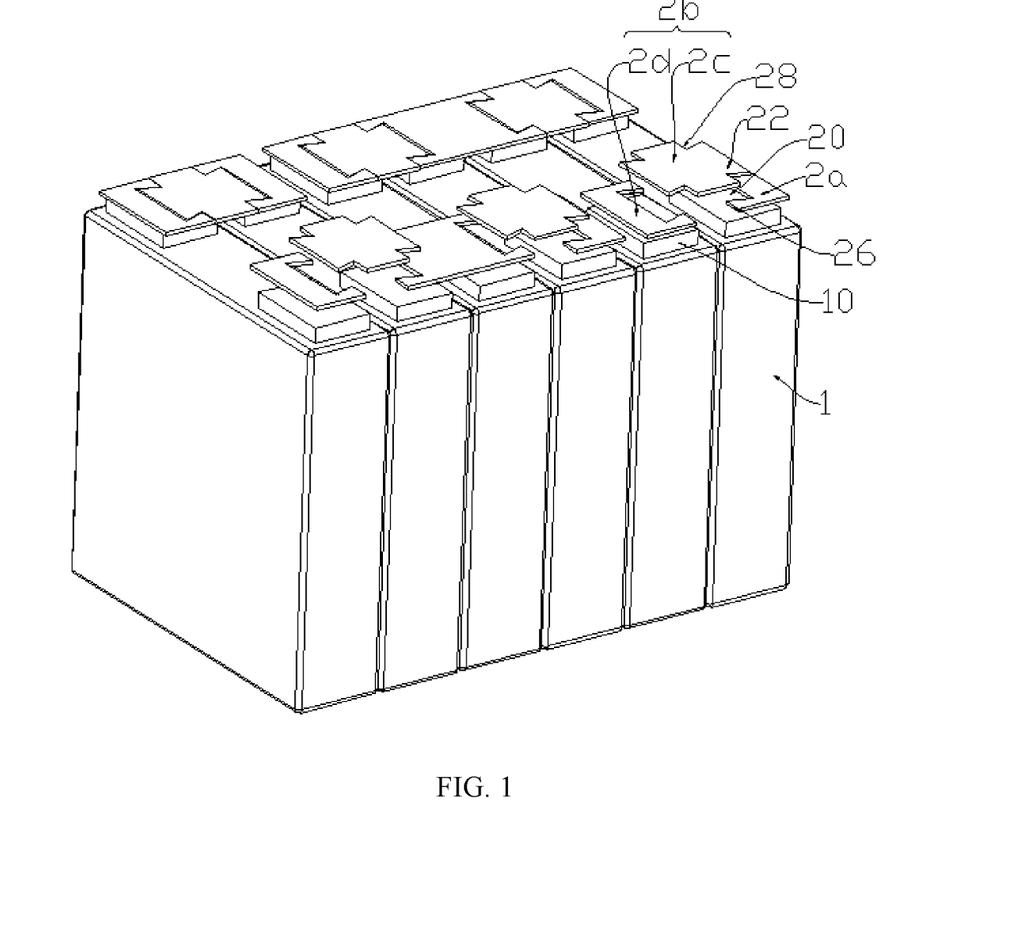
FIG. 1 is a structural schematic diagram of a battery module provided in an embodiment of the present disclosure.
Figure 2:
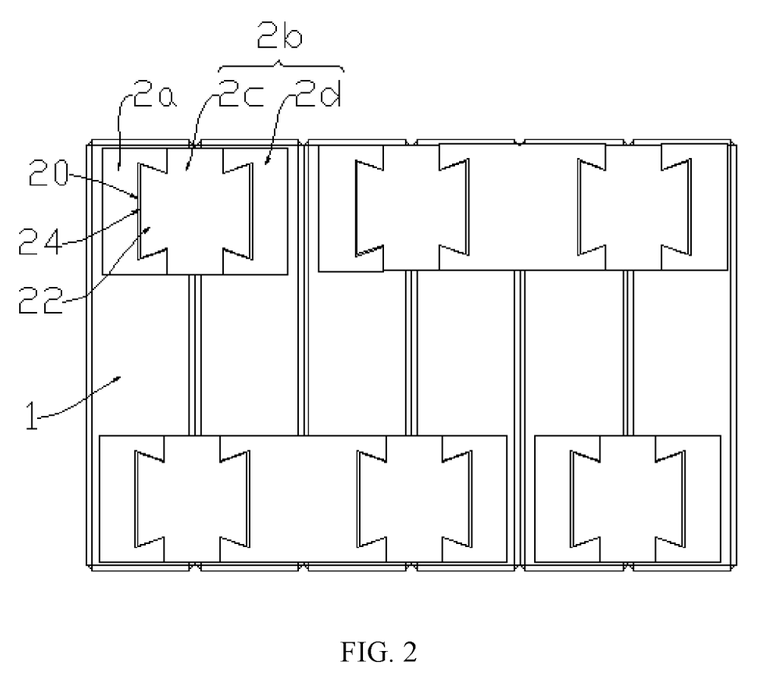
FIG. 2 is a top view of the battery module shown in FIG. 1.

Further, as shown in FIG. 1 and FIG. 2, the second fixed connecting piece 2b can include a transitional connecting piece 2c and a third fixed connecting piece 2d, the protrusion 22 is formed on the transitional connecting piece 2c, and the transitional connecting piece 2c connects the first fixed connecting piece 2a with the third fixed connecting piece 2d to increase the application scope of the connecting component 2. On the one hand, the connecting component 2 has a broader adjustment range for the height difference of the batteries, and on the other hand, the connecting component 2 can be reliably connected to more than two electrode terminals 10 at the same time, i.e., the transitional connecting piece 2c and the third fixed connecting piece 2d can be connected to different electrode terminals 10, respectively.

For example, two ends of the transitional connecting piece 2c are respectively engaged with and connected to the first fixed connecting piece 2a and the third fixed connecting piece 2d. The transitional connecting piece 2c is provided with a protrusion 22 at an end facing towards the first fixed connecting piece 2a, and the transitional connecting piece 2c is provided with a protrusion 22 or a recess 20 at an end facing towards the third fixed connecting piece 2d. Accordingly, the third fixed connecting piece 2d can be provided with a corresponding recess 20 or protrusion 22 for matching the transitional connecting piece 2c. The transitional connecting piece 2c can be provided as multiple pieces that are distributed along the extending direction of the connecting component 2 and sequentially connected to each other through engagement structures.

The above embodiments of the present disclosure are merely preferable embodiments, but not intended to limit the scope of the present disclosure. Any changes, equivalent substitutions or improvements made upon the concept of the present disclosure should fall into the protection scope of the present disclosure.

What is claimed is:

1. A battery module, comprising: a plurality of secondary batteries stacked along a thickness direction, a top of each of the plurality of secondary batteries being provided with an electrode terminal; and a connecting component provided at the top of the plurality of secondary batteries, the connecting component being connected to at least two electrode terminals for electrically connecting at least two secondary batteries of the plurality of secondary batteries, wherein the connecting component comprises a first fixed connecting piece and a second fixed connecting piece, and along an extending direction of the connecting component, the first fixed connecting piece matches and is engaged with the second fixed connecting piece; wherein an edge of the first fixed connecting piece is provided with a recess, and an edge of the second fixed connecting piece is provided with a protrusion for engaging with the recess; wherein the recess comprises two inner side walls and a bottom wall connecting the two inner side walls, the protrusion comprises two outer side walls and a top wall connecting the two outer side walls, and the inner side walls are in contact with and match the outer side walls;

wherein a distance between the two inner side walls gradually decreases in a direction facing away from the bottom wall, and a distance between the two outer side walls gradually decreases in a direction facing away from the top wall; and wherein the inner side walls are engaged with the outer side walls through a tooth structure, which is configured with each of the two inner walls having a first set of teeth, and each of the two outer walls having a second set of teeth that are engaged with the first set of teeth of a respective one of the two inner side walls; and wherein the recess is a dovetail slot, and the protrusion is a dovetail block matching the dovetail slot.

2. The battery module according to claim 1, wherein the second fixed connecting piece comprises a transitional connecting piece and a third fixed connecting piece, the protrusion is formed on the transitional connecting piece, and the transitional connecting piece connects the first fixed connecting piece with the third fixed connecting piece.

3. The battery module according to claim 1, wherein the recess penetrates the first fixed connecting piece in a thickness direction of the first fixed connecting piece, and the protrusion has a same thickness as the second fixed connecting piece.

4. The battery module according to claim 1, wherein a gap is formed between the bottom wall and the top wall.

5. The battery module according to claim 4, wherein the gap is located at a top of the electrode terminal, and does not exceed an edge of the electrode terminal.

* * * * *